Oct. 14, 1969 P. W. HAIT 3,472,039
HEMISPHERIC CRYOGENIC VACUUM TRAP AND VACUUM SYSTEM USING SAME
Filed Feb. 19, 1968 3 Sheets-Sheet 1

INVENTOR.
PAUL W. HAIT
BY
Leon F. Herbert
ATTORNEY

Oct. 14, 1969 P. W. HAIT 3,472,039
HEMISPHERIC CRYOGENIC VACUUM TRAP AND VACUUM SYSTEM USING SAME
Filed Feb. 19, 1968 3 Sheets-Sheet 2

INVENTOR.
PAUL W. HAIT
BY
Leon F. Herbert
ATTORNEY

Oct. 14, 1969 P. W. HAIT 3,472,039
HEMISPHERIC CRYOGENIC VACUUM TRAP AND VACUUM SYSTEM USING SAME
Filed Feb. 19, 1968 3 Sheets-Sheet 3

INVENTOR.
PAUL W. HAIT
BY
Leon F. Herbert
ATTORNEY

United States Patent Office 3,472,039
Patented Oct. 14, 1969

3,472,039
HEMISPHERIC CRYOGENIC VACUUM TRAP AND VACUUM SYSTEM USING SAME
Paul W. Hait, Beaverton, Oreg., assignor to Varian Associates, Palo Alto, Calif., a corporation of California
Filed Feb. 19, 1968, Ser. No. 706,494
Int. Cl. B01d 5/00
U.S. Cl. 62—55.5                                 12 Claims

ABSTRACT OF THE DISCLOSURE

A cryogenic vacuum trap and vacuum systems using same are disclosed. The cryogenic vacuum trap includes a hollow bulb-shaped vacuum tight envelope structure to be connected in gas communication with a chamber to be evacuated. A cryogenic reservoir is contained within the vacuum envelope. The reservoir is exposed to the gases within the vacuum envelope and is operated in use at cryogenic temperature for freezing condensable material onto its cold surfaces and thereby trapping the condensate. The bulb-shaped envelope structure includes a generally hemispheric wall section and the cryogenic reservoir container includes a generally hemispheric wall structure which is nested within and generally conforms to the hemispherical shape of the vacuum envelope wall.

DESCRIPTION OF THE PRIOR ART

Heretofore, vacuum systems have been built wherein a cryogenic vacuum trap was provided in line between a chamber to be evacuated and an oil diffusion vacuum pump. In one such system, the vacuum trap had a generally T-shaped standard pipe configuration wherein one arm of the T was connected to the sump of the chamber to be evacuated, the base leg of the T was connected to the vacuum pump and the other arm of the T was closed by a cover flange which supported a cryogenic reservoir having a cylindrical cold wall sleeve affixed thereto and extending into the other arm of the T. In this arrangement, the gas passageway through the vacuum trap had a length of approximately 20 inches and the cold wall sleeve decreased the diameter of the gas passage from 8 inches to 7 inches and resulted in constricting the flow of gas therethrough. As a result, the pumping speed of the pump which had a capacity of 1000 liters per second, was reduced to only 500 liters per second. Moreover, the relatively large T-shaped pipe fitting, forming the vacuum envelope of the cryogenic trap structure, was relatively heavy, bulky and expensive to manufacture.

In another prior art cryogenic vacuum trap, the vacuum envelope comprised a relatively large diameter section of cylindrical pipe having flange connections to smaller diameter pipe at opposite ends. A toroidal shaped cryogenic reservoir was contianed within the envelope and provided a gas passageway through the center of the toroid. A cryogenic baffle was suspended in the gas passageway through the center of the toroidal reservoir to block a direct line of sight path from the input port to the output port of the trap. Provision of the baffle in the interior of the toroidal reservoir greatly reduced the gas conductance of the trap. Moreover, the trap could not be easily cleaned since, in order to clean the trap, the trap flanges had to be unfastened and the entire trap removed from the system.

Therefore, a need exists for an improved cryogenic vacuum trap which will provide relatively high gas conductance, will be relatively light and compact and which will be of such a construction as to facilitate cleaning and removal of the trap elements.

SUMMARY OF THE PRESENT INVENTION

The principal object of the present invention is the provision of an improved cryogenic vacuum trap and vacuum systems using same.

One feature of the present invention is the provision, in a cryogenic vacuum trap, of a generally hollow bulb-shaped vacuum envelope structure containing a cryogenic reservoir therewithin, such reservoir being thermally insulatively supported therein, and wherein a section of the vacuum envelope is generally of hemispherical shape with the reservoir having a generally hemispheric outer wall nested within and generally conforming to the shape of the hemispherical envelope, whereby the complexity and weight of the cryogenic vacuum trap may be reduced.

Another feature of the present invention is the same as the preceding feature wherein the reservoir includes an access passageway therethrough with the axis of the access passageway being radially directed of generally hemispheric reservoir and envelope walls to permit mechanical access through the reservoir into the interior of the vacuum envelope for manipulation of baffles or to provide a gas access passageway through the cryogenic vacuum trap.

Another feature of the present invention is the same as any one of the preceding features wherein the generally hemispheric section of the envelope structure includes a demountable vacuum tight seal at its lip which adjoins the remaining portion of the bulb-shaped vacuum envelope, whereby removal of the hemispheric portion of the envelope facilitates access to the interior of the vacuum trap for cleaning and maintenance thereof.

Another feature of the present invention is the same as any one or more of the preceding features wherein the bulb-shaped vacuum envelope structure includes a movable baffle either in the form of a rotatable disk, extensible shade, or a ventilated hinged member, which may be manipulated by means of a feed-through-actuator mounted in the side wall of the bulb-shaped vacuum envelope structure, whereby the gas conductance through the vacuum trap may be readily controlled and whereby the absorption of radiant energy within the vacuum trap may be controlled to conserve cryogenic fluid.

Other features and advantages of the present invention will become apparent upon a perusal of the following specification taken in connection with the accompanying drawings wherein:

DESCRIPTION OF THE PREFERRED EMBODIMENTS

Figure 1:
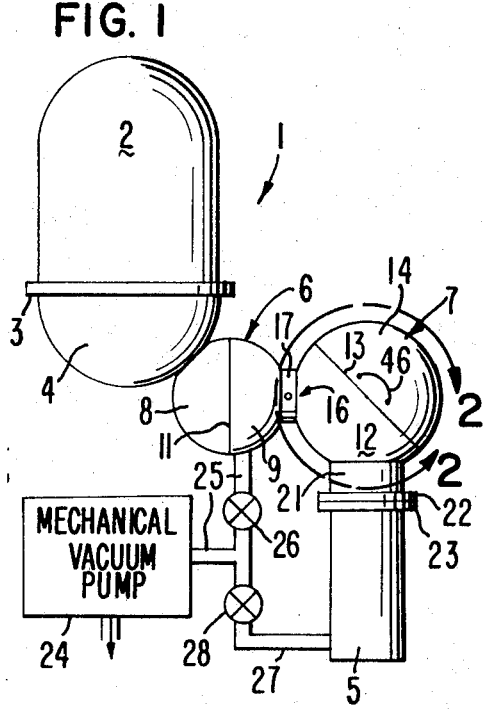
FIG. 1 is a side elevational view, partly schematic and partly in block diagram form, depicting a vacuum system of the present invention.

Referring now to FIG. 1, there is shown a vacuum system 1 incorporating features of the present invention. The vacuum system 1 includes a bell jar 2 or other chamber to be evacuated mounted over a base plate 3 having a central aperture, not shown, communicating with the interior of the bell jar 2. A sheet metal hemispherical sump 4 is sealed at its lips to the base plate. An oil diffusion pump 5 is connected in gas communication with the bell jar 2 and sump 4 via the intermediary of a pair of spherically shaped hollow bulb connectors 6 and 7. Bulb connector 6 includes first and second hemispheric sheet metal members 8 and 9 sealed together at their mating lip portions 11 by means of a demountable vacuum tight seal, such as for example that produced by an O-ring, not shown. Sheet metal hemispheres 4 and 8 include aligned apertures defining a gas communcation passageway therebetween. The lips of the apertures are welded together to form a gas tight seal around the apertures and to define a gas communication passageway between the sump 4 and the spherical connector 6.

Figure 2:
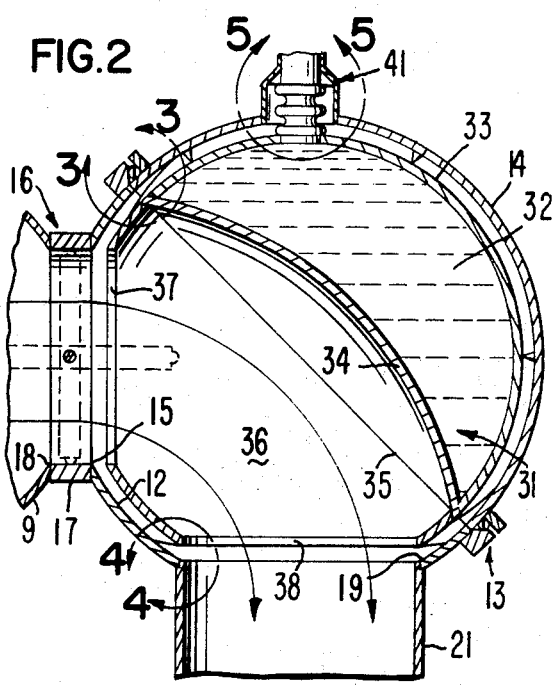
FIG. 2 is an enlarged cross-sectional view of a portion of the structure of FIG. 1 delineated by line 2—2.

The other spherical bulb connector 7 includes a first hemispheric sheet metal member 12, sealed at its lip via a demountable O-ring seal 13, more fully shown in FIG. 2, to a removable sheet metal hemispheric member 14. The lower hemisphere member 12 includes a first opening 15, therein communicating with the connecting sphere 6 via a butterfly valve assembly 16. The butterfly valve assembly 16 is contained within an annular collar 17, which is sealed as by welding to the margins of aligned openings 18 and 15 in the spherical connectors 6 and 7, respectively.

The lower hemisphere member 12 includes a second opening 19 having a pipe 21 welded to its inner marginal edge. The pipe 21 is flanged at 22 (see FIG. 1) for mating with a flange 23 on the end of the diffusion pump 5. A mechanical vacuum pump 24 is connected into the hemispherical member 9 of the spherical connector 6 via exhaust tubulation 25 and a control valve 26. The mechanical vacuum pump 24 is also connected for pumping the diffusion pump 5 via an exhaust tubulation 27 and control valve 28.

Referring now to FIG. 2, the spherical bulb connector 7 includes a cryogenic vacuum trap structure 31 contained therewithin. The cryogenic vacuum trap 31 includes a cryogenic reservoir 32 formed by the region contained within a generally hemispheric sheet metal outer wall 33 and a spherically curved inner wall 34. The outer wall 33 is nested within and generally conforms to the shape of the hemispheric vacuum wall 14 of the connector 7. The inner wall 34 of the reservoir 32 is formed by an inwardly dished sheet metal spherical section having a radius of curvature substantially larger than the radius of curvature of the hemispherical outer wall 33. The inner and outer walls 33 and 34, respectively, are joined together at their adjoining lip portions 35 by means of a pheripheral weld.

Figure 5:
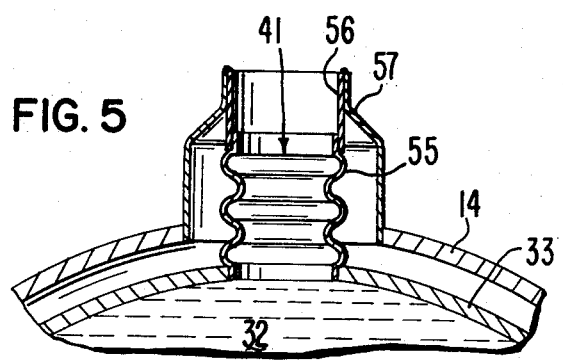
FIG. 5 is an enlarged sectional view of a portion of the structure of FIG. 2 delineated by line 5—5.

A generally hemispheric sheet metal cold wall structure 36 is disposed in mutually opposed relation to the outer hemisphercial wall 33 of the reservoir 32 and is sealed as by welding to the lip of the hemispherical member 33 to form a generally spherically shaped bulb structure. The hemispherical cold wall structure 36 includes a pair of circular openings 37 and 38 disposed in alignment with the openings 15 and 19 in the vacuum envelope of the spherical connector 7. The cold wall 36 is preferably made of a material having relatively good thermal conductivity, such as copper, and is preferably nickel plated to reduce its outgassing properties. A fill port structure 41, more fully described below with regard to FIG. 5, is disposed at the point of highest elevation on the reservoir 32 for filling the reservoir with a suitable cryogenic liquid, such as for example, liquid nitrogen.

Figure 3:
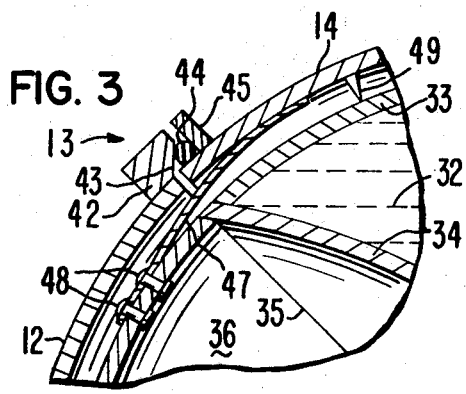
FIG. 3 is an enlarged detailed sectional view of a portion of the structure of FIG. 2 delineated by line 3—3.

Referring now to FIG. 3, the demountable seal structure 13 and the thermally insulative support structure for supporting the reservoir 31 are described in greater detail. The demountable vacuum seal structure 13 includes a metallic ring 42, fixedly secured as by welding to the outer marginal lip of the lower hemispherical section 12. An inner surface of the ring 43 is bevelled at an angle of approximately 45° to receive a resilient O-ring 44, as of rubber. The O-ring is pressed into sealing engagement with the bevelled surface 43 and with the outer surface of the marginal lip of the upper hemispherical envelope section 14 by means of an annular ring 45 fixedly secured, as by welding, to the outer peripheral margin of the lip of the upper hemisphere 14. As the pressure is reduced within the connector structure 7, the atmospheric pressure tends to force the two hemispherical members 12 and 14 together, thereby compressing the O-ring 44 into firm sealing engagement. However, when the vacuum pressure within the envelope 7 is raised to atmospheric pressure, the upper hemispherical member 14 may be easily removed by the operator grasping a pair of handles 46 affixed thereto, (see FIG. 1) and merely pulling the hemisphere 14 off of the lower hemisphere 12.

The cryogenic vacuum trap structure 31 is thermally insulatively supported from the upper hemispherical section 14 by means of a pair of diametrically disposed thin and narrow sheet metal straps 47, as of stainless steel, fixed at one end as by welding to the inside surface of the hemisphere 14 and to the outer surface of the bulb-shaped cold wall 36 via a pair of rivets 48. The straps 47 are under considerable tension and they hold the outer hemispheric wall 33 of the reservoir 32 into engagement with the relatively sharp points of a plurality of conically shaped support members 49, as of stainless steel, welded at a number of points to the inside surface of the outer hemispherical member 14. In this manner, the cryogenic vacuum trap structure 31 is fixedly secured to the upper hemispherical section 14 of the envelope structure such that when the upper hemisphere 14 is removed, the cryogenic vacuum trap structure 31 is also removed, thereby gaining access to the interior of the vacuum trap structure 31 for cleaning and also permitting access via ports 19 and 15 to the interior of the oil diffusion pump 5 and to the butterfly valve 16, respectively.

Figure 4:
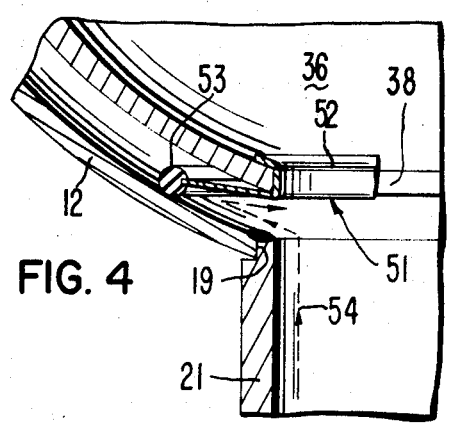
FIG. 4 is an enlarged detailed view of a portion of the structure of FIG. 2 delineated by line 4—4.

Referring now to FIG. 4, there is shown an anticreep ring structure 51, disposed about the outer peripheral edge of the lower aperture 38 in the cold wall 36. The anticreep ring 51 comprises a relatively thin annular ring of metal, as of 0.008 inch thick stainless steel, clipped to the inside marginal edge of the opening 38 via tabs 52 and including a resilient O-ring 53, as of rubber, integrally molded to the outer peripheral margin of the anticreep ring 51. The purpose of the anticreep ring 51 is to freeze out oil which tends to creep up the inside wall of the pipe 21 from the oil diffusion pump 5. If the oil seepage were not stopped, it would continue to creep along the vacuum wall 12 through the cryogenic vacuum trap 31. As the oil creeps up the wall 21 and along the inner surface of the vacuum envelope 12, as indicated by the dotted line 54, it encounters the sealing ring 53, thus causing it to continue its creeping action onto ring 51. Ring 51 is in thermal contact with the cold wall 36 and, therefore, is a cryogenic temperature causing the creeping oil to freeze out and to be trapped.

Referring now to FIG. 5, there is shown the cryogenic fill port structure 41. The fill port structure 41 includes a thin stainless steel bellows 55 welded at one end to the inside periphery of an aperture in the top wall 33 of the reservoir 32. The outer end of the bellows 55 is sealed, as by welding, to a tubular member 56, which is welded at its outer end to a tubular adapter 57. The inside end of the tubular adapter 57 is welded to the margin of an opening in the hemispherical envelope member 14. The bellows 55 provides a high thermal resistive path for the flow of thermal energy from the external environment into the reservoir 32 while forming a portion of the vacuum wall of the vacuum envelope structure.

Figure 6:
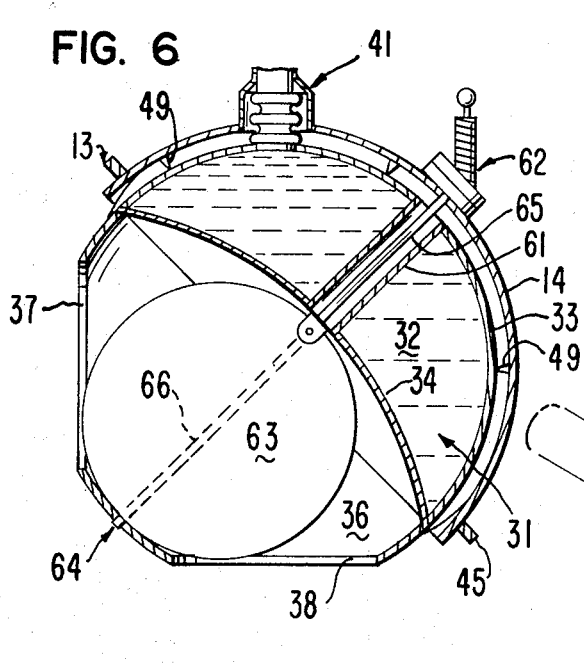
FIG. 6 is a cross-sectional view similar to that of FIG. 2 depicting an alternative embodiment of the present invention.

Referring now to FIG. 6, there is shown an alternative cryogenic vacuum trap 31 of the present invention. In this trap 31, the inside and outside walls 34 and 33, respectively, of the cryogenic reservoir 32 are centrally apertured to receive a cylindrical pipe 61, as of stainless steel which is welded to the marginal edges of the openings in the walls 34 and 33, respectively, to define an access passageway extending through the reservoir 32 in the radial direction of the bulb structure formed by members 33 and 36. A mechanical feed-through actuator 62 is disposed at the outside end of the passageway 61 and provides a mechanical feed-through for translating mechanical motion through the vacuum wall of the vacuum envelope 14. A thermally conductive metallic disk 63, as of nickel plated copper, is pivotably supported about a pivot shaft 64 on a diameter passing through the generally spherically shaped trap structure 31 including cold wall 36 and reservoir wall 33. A rotatable shaft 65 extends coaxially of the passageway 61 and interconnects the mechanical actuator 62 with the disk 63 for rotation thereof. The disk 63 forms a baffle plate and operates in use at cryogenic temperature due to its thermal contact with the cold wall 36 via the pivot shaft 64. The baffle plate 63 may be turned into the plane of the paper, as shown in FIG. 6, to provide full gas conductance through the cryogenic vacuum trap 31. When the baffle plate 63 is rotated 90° as indicated by the dotted lines 66, the gas conductance through the cryogenic vacuum trap structure 31 is substantially reduced. Thus, the mechanical actuator 62 provides means for variably controlling the gas conductance of the trap 31.

Figure 8:
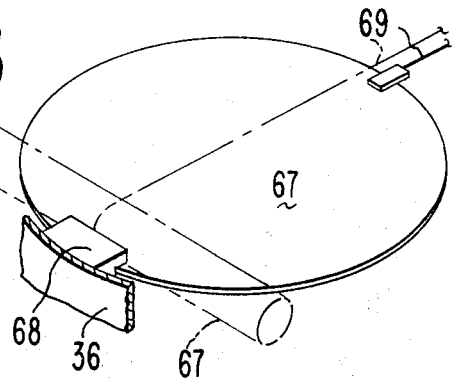
FIG. 8 is an enlarged schematic perspective view of a portion of the structure of FIG. 7 delineated by line 8—8.
Figure 7:
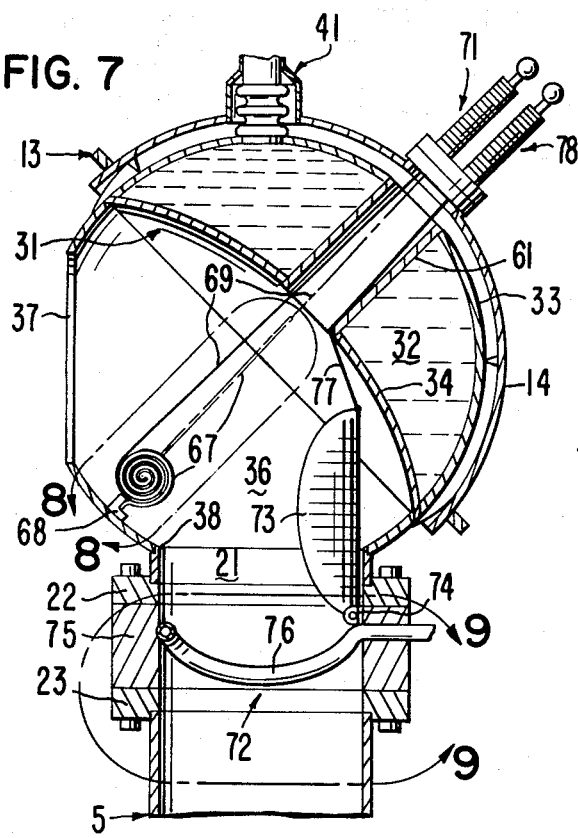
FIG. 7 is a schematic sectional line diagram similar to that of FIG. 2 depicting an alternative embodiment of the present invention.

Referring now to FIGS. 7 and 8, there is shown an alternative baffle arrangement of the present invention. In the apparatus of FIG. 7, the structure is substantially the same as previously described with regard to FIG. 6 with the exception that baffle plate 63 is replaced by a spirally wound sheet metal disk 67 of spring material, as of beryllium copper, which is affixed at an edge portion thereof to a thermally conductive block 68, as of copper, mounted to the inside of the cold wall 36. An actuating cable 69 is affixed to one edge of the sheet metal baffle 67. The cable 69 extends through the access passageway 61 to a mechanical feed-through actuator 71. The baffle disk 67, being made of a resilient spring-like material, is initially rolled up into a spiral form as shown in FIG. 7, as indicated in dotted lines of FIG. 8. In this position, the gas conductance through the trap structure 31 is at a maximum. When it is desired to decrease the gas conductance through the trap 31, the actuator 71 is worked by the operator to cause the cable 69 to pull the shade-like baffle disk 67 out of its spiral configuration and across the gas passageway communicating between the ports 37 and 38 of the trap 31. When the shade-like baffle 67 is fully extended across the gas passageway, the gas conductance of the trap structure 31 is at a minimum.

Figure 9:
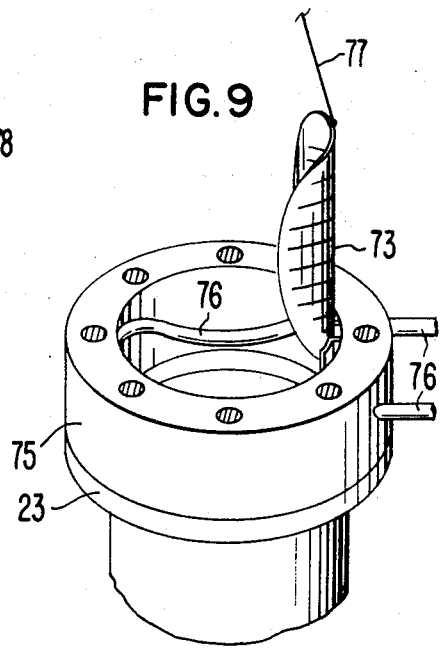
FIG. 9 is a schematic perspective view of a portion of the structure of FIG. 7 delineated by lines 9—9.

A watercooled baffle structure 72 is also shown in FIGS. 7 and 9. The watercooled baffle 72 includes a ventilated baffle plate 73, as of copper, having a generally cylindrically curved shape. The baffle plate 73 is hinged at 74 to the inside wall of an annular ring segment 75, fitted into the flange structure, which connects the pipe 21 to the vacuum pump 5. More particularly, the annular ring 75 is sandwiched between flange members 22 and 23, respectively. A water coolant pipe 76 passes through the ring 75 to the inside bore of the ring 75 and is arranged to loop around the inside wall of the bore in such a manner as to abut the edges of the curved baffle plate 73, when the plate 73 is pivoted to extend across and block the passageway. An actuating cable 77 is affixed to the edge of the plate 73 at a point diametrically opposed to the point of pivot 74. The actuating cable 77 extends through access passageway 61 to a mechanical feed-through actuator 78, such that the baffle plate 73 may be lowered or raised out of the way, as desired, by operation of the actuator 78. In the lower position, the baffle plate 73 extends across the gas passageway through the pipe 21, thereby blocking the flow of radiant energy from the relatively hot diffusion pump to the inside cold wall surfaces of the cryogenic vacuum trap 31 to conserve the cryogenic fluid. Typically at night the vacuum system is in a stand-by condition and the baffle 73 is lowered to conserve the cryogenic fluid. The louvers in the baffle plate 73 permit the vacuum pump 5 to pump gas through the plate 73, but the shape of the louvers prevents radiated energy from passing through the baffle 73 to the cryogenic vacuum trap 31.

Figure 10:
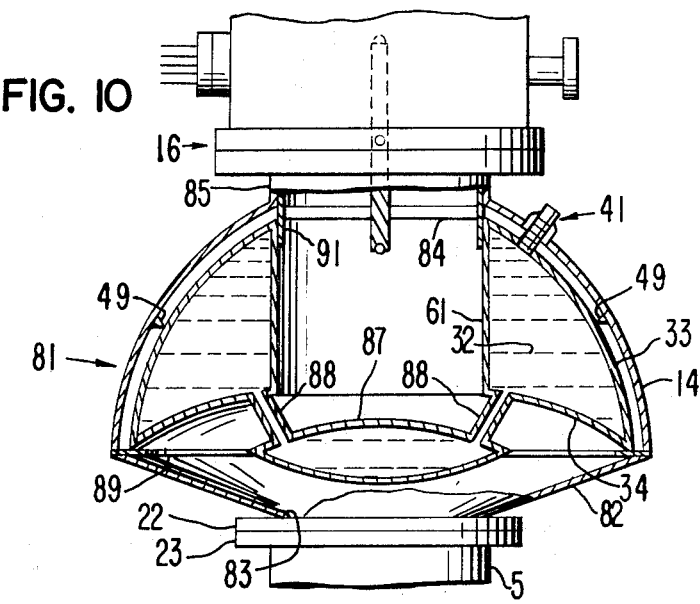
FIG. 10 is a sectional view, partly in elevation, of an alternative cryogenic vacuum trap of the present invention.

Referring now to FIG. 10, there is shown an alternative cryogenic vacuum trap 81 incorporating features of the present invention. The cryogenic vacuum trap 81 of FIG. 10 is similar to that previously described with regard to FIGS. 1–4 and includes a generally bulb-shaped vacuum envelope structure having a sheet metal hemispherical section 14 sealed at its lip to the lip of a mutually opposed spherically curved section 82. Section 82 has a radius of curvature substantially larger than the radius of curvature of the upper hemispheric section 14. The lower spherically shaped section 82 includes a central aperture 83 and is sealed to flange member 22 as by welding at the periphery of the central aperture 83. Envelope sections 82 and 14 are sealed together at their mating lip portions as by a peripheral weld. Hemispheric envelope member 14 includes an enlarged circular opening 84 at the top thereof, which is sealed at its marginal edge to a cylindrical pipe 85 as by welding. A flange 86, which may also contain a butterfly valve structure 16, is affixed to the upper end of the pipe 85 for mounting the cryogenic vacuum trap to a system to be evacuated.

The radially directed access passageway 61 through the reservoir 32 has an inside diameter substantially equal to the inside diameter of the pipe 85 to provide a high conductance gas passageway through the cryogenic vacuum trap 81 from the flanged input port 84 through to the flanged output port 83. A flattened spheroidal shaped baffle reservoir portion 87 is disposed at the inside end of the passageway 61 and is hollow and supplied with cryogenic fluid from the main reservoir 32 via feed pipes 88 communicating with the interior of the baffle reservoir 87. The pipes 88 also serve to support the baffle 87 within the trap structure. The baffle reservoir 87 has an outside diameter slightly larger than the inside diameter of the gas access passageway 61 to block a straight line path between the input port 85 and the output port 83.

An anticreep ring 89 extends radially inward from the joint between the envelope sections 14 and 82 and is contacted by the inside edge of the reservoir 32, such that the creepring 89 operates at cryogenic temperatures to prevent creepage of oil along the inside of the vacuum envelope wall.

The cryogenic reservoir 32 is thermally insulatively supported from the inside wall of the hemispheric envelope member 14 via the plurality of the conically shaped supports 49. The reservoir 32 is held against the supports 49 by means of two thin narrow stainless steel straps 91 diametrically disposed interconnecting the inside wall of the passageway 61 and the inside wall of the pipe 85. The straps 91 are fixedly secured to the pipe 85 and passageway 61 via spot welding.

The cryogenic vacuum trap 81 of FIG. 10 has the advantage of utilizing relatively thin walled hemispheric envelope members and similarly shaped reservoir members, thereby reducing the weight and the complexity of the design. In addition, by disposing the baffle reservoir 87 in the enlarged open portion of the structure at the inner end of the passageway 61, the gas conductance around the outside of the cryogenic baffle 87 is increased as compared to the prior art baffles, thus, obtaining a more effective line of sight blockage of the gas flow between the input port 85 and the output port 83 for a given gas conductance through the trap 81.

Figure 11:
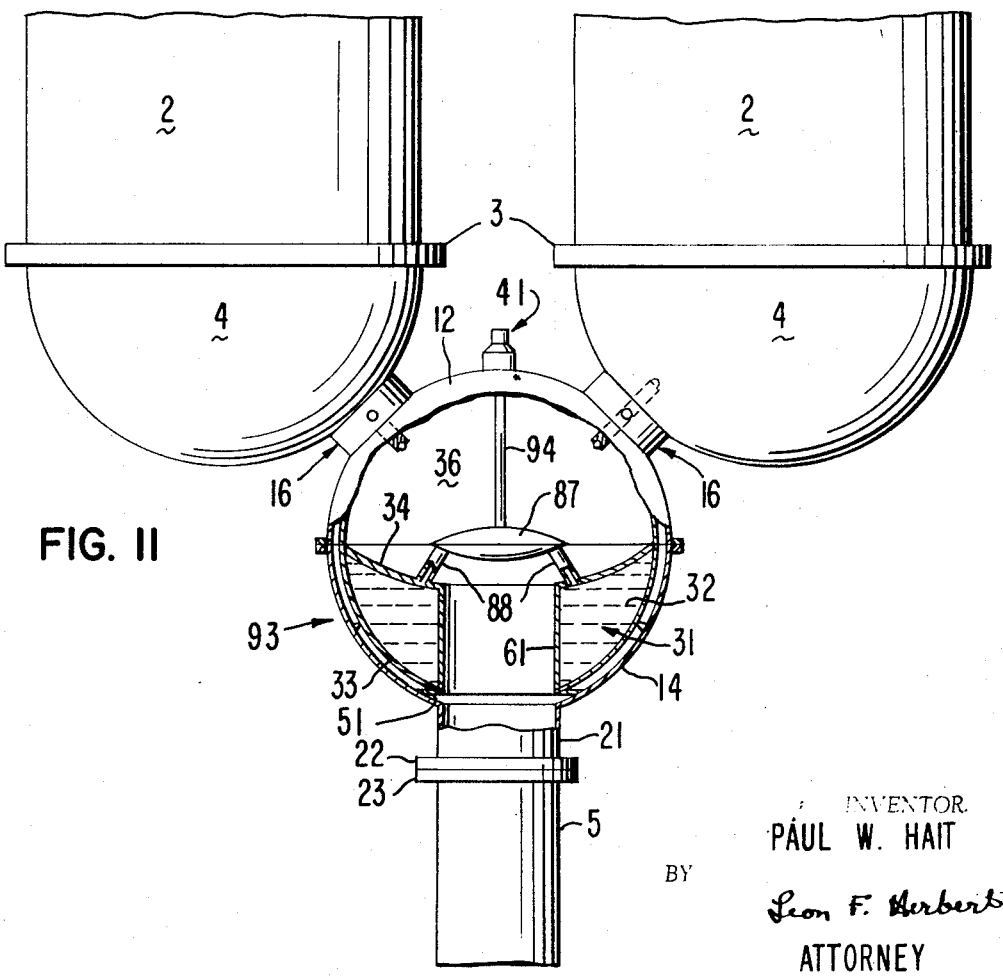
FIG. 11 is a side elevational view, partly in section, depicting an alternative vacuum system incorporating features of the present invention.

Referring now to FIG. 11, there is shown an alternative cryogenic vacuum trap 93 of the present invention. The cryogenic vacuum trap 93 is similar to the structure of FIGS. 2 and 10, with the exception that the hemispherical envelope section 14 is welded at its lip portion to the similar mating lip portion of the opposed hemispherical envelope section 12. As in the structure of FIG. 10, access passageway 61 is increased in diameter to equal the inside diameter of the exhaust pipe 21. Trap structure 31, including the cold wall 36, is fixedly and insulatively supported from the inside surface of the hemispheric envelope member 14. The two ports in the hemispheric envelope member 12 are connected to butterfly valve assemblies 16, which in turn are connected to hemispheric sumps 4 via circular openings cut through the wall of the sumps 4. The flattened spheroidal shaped cryogenic reservoir baffle 87 is disposed above the liquid level in the main reservoir 32 and a fill pipe 94 communicates from fill port 41 to the baffle 87 for supplying cryogenic liquid to the cryogenic reservoirs 87 and 32, respectively. The anticreep ring 51 is disposed about the lower end of the gas access passageway 61. An advantage of the vacuum system of FIG. 11 is that a single pump and cryogenic vacuum trap structure 93 may be utilized for selectively pumping down a pair of bell jars 2.

An advantage of the various vacuum systems and cryogenic vacuum traps, above described and forming the subject matter of the present invention, resides in the fact that relatively thin wall envelope structures and relatively thin wall cryogenic reservoir structures may be employed to provide relatively large volumes of cryogenic fluid with a minimum of weight and complexity. For example, the hemispheric members 12, 14, 33 and 34 are typically fabricated from sheets of 304 stainless steel, having a thickness ranging from 0.040 inch to 0.060 inch for traps from 4 inches in diameter to 14 inches in diameter. The cryogenic vacuum trap of FIG. 2 with 8 inch diameter ports 37 and 38 provides ample cold wall pumping capacity without constricting the throughput conductance to the pump 5. Therefore, the full 1000 liters per second of pumping speed for the oil diffusion pump 5 may be realized. The shipping weight for a cryogenic vacuum trap of the present invention as compared to those of the prior art is substantially less. Moreover, the traps of the present invention are more easily fabricated and maintained.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. In a cryogenic vacuum trap, means forming a vacuum tight envelope structure for connection in gas communication with a chamber to be evacuated, means for containing a cryogenic fluid to define a cryogenic reservoir, said reservoir container being thermally insulatively supported within said vacuum envelope structure, an outer surface of said reservoir being operated in use at cryogenic temperature and being exposed to the gases within said envelope structure for freezing condensable material on its cold surfaces thereby trapping the condensate, the improvement wherein said envelope structure includes a generally hemispheric sheet metal outer wall section, said reservoir container means including a generally hemispheric sheet metal outer wall nested within and generally conforming to said hemispheric outer envelope wall, whereby the construction of the cryogenic vacuum trap is simplified and its weight reduced.

2. The apparatus of claim 1, wherein said reservoir container means includes a dish-shaped inner wall having a larger radius of curvature than said outer wall of said reservoir, said inner wall being dished inwardly of said outer reservoir wall, said inner and outer walls of said reservoir being sealed together around the periphery of their adjoining lips to define said reservoir container in the space between said inner and outer walls of said reservoir.

3. The apparatus of claim 2, wherein said reservoir container means includes means defining an access passageway open on its ends and passing through said reservoir, the axis of said access passageway being radially directed of said inner and outer walls of said reservoir.

4. The apparatus of claim 1, including thermally insulative support structure disposed between said nested hemispheric walls of said reservoir and said envelope for fixedly supporting said reservoir from said hemispheric envelope structure.

5. The apparatus of claim 2, including a generally hemispheric cold wall structure disposed in mutually opposed relation to said hemispheric outer wall of said reservoir, said hemispheric cold wall being joined at its lip to said reservoir, and said hemispheric cold wall having an opening therein defining a gas passageway into the interior of said cold wall structure.

6. The apparatus of claim 5, wherein said vacuum envelope structure includes a second generally hemispheric wall structure disposed in mutually opposed relation to said first mentioned hemispheric wall of said envelope, the lips of said first and second hemispheric envelope walls adapted to adjoin each other, and means forming a demountable vacuum tight seal for sealing together the lips of said first and second hemispherical envelope walls, thus forming a generally spheric vacuum envelope structure containing said cryogenic reservoir and said cold wall.

7. The apparatus of claim 3, wherein said vacuum envelope structure includes a gas passageway therein, means forming a movable baffle disposed within the gas passageway in said vacuum envelope structure, means forming a mechanical feed-through actuator disposed in said hemispheric wall of said envelope in alignment with said access passageway through said reservoir, and means forming a mechanically operative connection between said feed-through actuator means and said movable baffle for changing the position of said baffle.

8. The apparatus of claim 7, wherein said baffle comprises a disk pivotably supported in the gas passageway of said evacuated envelope structure, said actuator serving to rotate said baffle for controlling the gas conductance of the gas passageway in said vacuum envelope.

9. The apparatus of claim 7, wherein said baffle is a spirally wound sheet of metallic material, and said actuator includes means for pulling and unwinding said sheet of material across the gas passageway.

10. The apparatus of claim 7, wherein said baffle is a ventilated cylindrically curved sheet metal structure, said baffle being hinged at one end to the inside wall of the gas passageway through said vacuum envelope structure, and wherein said actuator includes a cable extending to said hinged baffle for pivoting said baffle about its hinge toward the wall of the gas passageway to open the gas passageway through said evacuated envelope structure.

11. The apparatus of claim 3, wherein said vacuum envelope structure includes a generally spherically curved sheet metal section disposed in mutually opposed relation to said first hemispheric envelope section, said spherically curved section being joined at its lip to the lip of said hemispheric envelope section, thus forming a hollow bulb-shaped vacuum envelope structure, said hemispheric section of said bulb-shaped envelope structure having an opening therein in alignment with one end of said access passageway through said reservoir, and the other spherically curved member of said bulb structure having an opening therein to define with said access passageway and said first opening a gas passageway through said bulb structure.

12. The apparatus of claim 11, including a generally flattened spheroidal-shaped cryogenic reservoir portion mounted over the inner end of said access passageway through said cryogenic reservoir for baffling the flow of gas through the gas passageway in said bulb-shaped envelope structure.

References Cited

UNITED STATES PATENTS

| 3,256,706 | 6/1966 | Hansen | 62—55.5 |
| 3,262,279 | 7/1966 | Moore | 62—55.5 |

FOREIGN PATENTS 716,283   8/1965   Canada.

LLOYD L. KING, Primary Examiner